May 3, 1927.

S. H. CAMPBELL 1,626,596

NUT LOCK

Filed March 1, 1926

INVENTOR
S.H. CAMPBELL

BY

ATTORNEY

Patented May 3, 1927.

1,626,596

UNITED STATES PATENT OFFICE.

STERLING H. CAMPBELL, OF ST. LOUIS, MISSOURI, ASSIGNOR TO RAILWAY DEVICES COMPANY, OF ST. LOUIS, MISSOURI, A CORPORATION OF MISSOURI.

NUT LOCK.

Application filed March 1, 1926. Serial No. 91,298.

The object of my invention is to provide a simple and effective form of nut lock in which the locking effect is secured by spreading the end of the bolt whereby the expense of additional parts is avoided and the bolt and nut may be reused. I am aware that bolts have been heretofore provided with slots in their ends to admit a wedge-shaped tool to expand the end of the bolt. I have found, however, that under many conditions there is a tendency to tilt the nut, which tilting action draws the parts of the bolt together at the end closing the slot and rendering the device inoperative. The object of the present invention is to provide the bolt with means giving access to the expanding slot after it has been closed by the action of the bolt.

Figure 1:
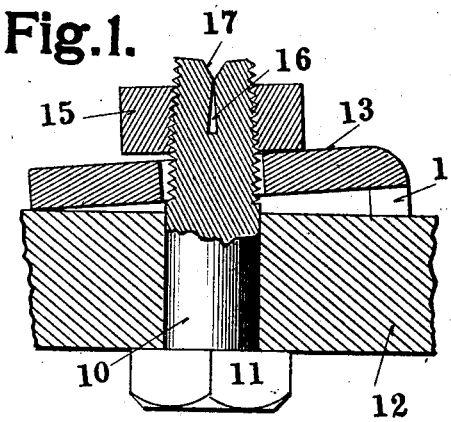
Figure 2:
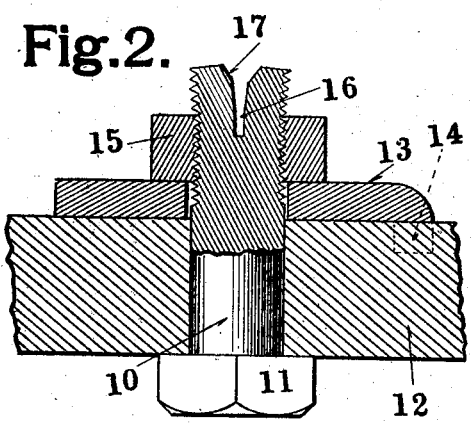
Figure 3:
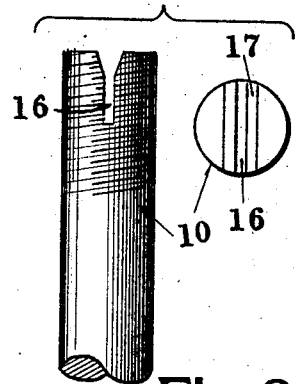

In the accompanying drawings, which illustrate a nut locking device made in accordance with my invention, together with certain modifications of the bolt used therein, Figure 1 is a vertical section showing the nut partially drawn to position; Figure 2 is a similar section showing the nut completely drawn up and the end of the bolt expanded; Figure 3 is a detail side and end view of the bolt; and Figures 4, 5, 6 and 7 are views similar to Figure 3 but showing several modifications of the bolt.

Referring first to Figures 1, 2 and 3, the bolt indicated at 10 is provided with the usual head 11 and passes through parts 12 and 13 which may be respectively a floor board and a clip to be secured thereto. The clip 13 is provided with a spur 14 to prevent its rotation. This spur causes the clip to lie at an angle to the axis of the bolt and this tends to tip the nut 15 as it is drawn up and would thus render the expanding slot 16 useless if means were not provided to give access to it. In my preferred form this means consists of a secondary slot 17 with inclined side formed at the outer end of the expanding slot 16. This, as is clearly shown in Figure 1, provides access to the expanding slot so that the end of the bolt may be spread, as shown in Figure 2, by a suitable wedge-shaped tool.

Figure 4:
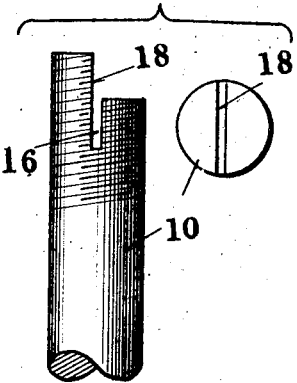

In Figure 4 I have shown a modification in which one side of the bifurcated end of the bolt is made shorter than the other so as to have a flat face 18 on the long side. It will be evident that a suitable tool may be placed against the face and the long end hammered over to open the end of the expanding slot.

Figure 5:
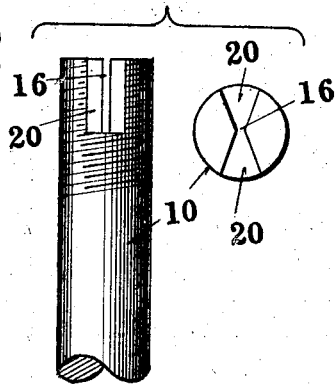

The slot 20 in the end of the form of bolt shown in Figure 5 is double V-shaped in form the inclined faces opening laterally. The expanding tool may be inserted from either side of the bolt in this form, the expanding slot 16 being formed between the apices of the two parts formed by the double V-slot.

Figure 6:
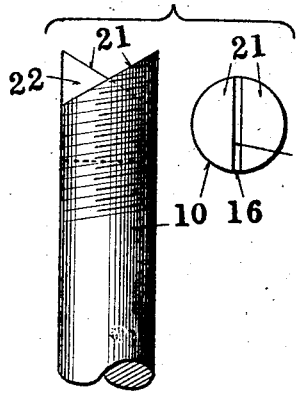

In the form shown in Figure 6 the ends of both sides of the bolt are beveled to form inclined faces 21, which faces are inclined in opposite directions so that either side of the bolt may be hammered over to open the slot by placing a tool against one of the two flat side faces 22 thus exposed.

Figure 7:
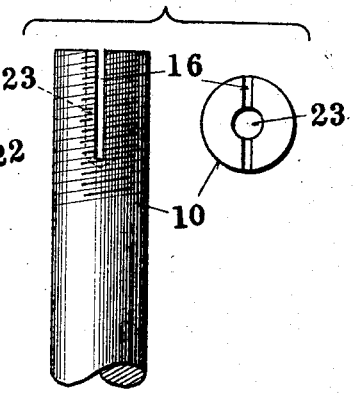

In the form shown in Figure 7 a central opening 23 is formed in the end of the bolt so that a conical tool may be inserted from the end to open up the expanding slot 16.

Having fully described my invention, what I claim as new and desire to secure by Letters Patent of the United States is:

1. In a device of the class described, the combination with a threaded bolt, of a cooperating nut, said bolt having a slot formed in its end, said slot having a lateral opening with converging sides for the insertion of a tool to expand the bolt.

2. In a device of the class described, the combination with a threaded bolt, of a cooperating nut, said bolt having a slot formed in its end, said slot being narrowest along the axis of the bolt and expanding to each side thereof whereby a pair of laterally opening inclined tool ways are provided.

In testimony whereof, I hereunto affix my signature, this 26th day of February, 1926.

STERLING H. CAMPBELL.